(12) United States Patent
Oggianu et al.

(10) Patent No.: US 11,993,452 B2
(45) Date of Patent: May 28, 2024

(54) ENCLOSURE WITH UWB SENSOR

(71) Applicant: Carrier Corporation, Palm Beach Gardens, FL (US)

(72) Inventors: Stella M. Oggianu, Farmington, CT (US); Ankit Anand Gupta, Mysore (IN); Siddesh Vishwanath, Mysore (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 623 days.

(21) Appl. No.: 17/057,470

(22) PCT Filed: Aug. 16, 2019

(86) PCT No.: PCT/US2019/046736
§ 371 (c)(1),
(2) Date: Nov. 20, 2020

(87) PCT Pub. No.: WO2020/037168
PCT Pub. Date: Feb. 20, 2020

(65) Prior Publication Data
US 2021/0198033 A1    Jul. 1, 2021

(30) Foreign Application Priority Data

Aug. 16, 2018  (IN) .............................. 201811030636

(51) Int. Cl.
*B65D 88/74*  (2006.01)
*B60P 3/20*  (2006.01)
*G01S 13/04*  (2006.01)

(52) U.S. Cl.
CPC ............... *B65D 88/74* (2013.01); *B60P 3/20* (2013.01); *G01S 13/04* (2013.01)

(58) Field of Classification Search
CPC . B65D 88/74; B60P 3/20; G01S 13/04; G01S 7/411; G01S 13/0209; G01S 13/06; G01S 13/886; G01S 7/003
See application file for complete search history.

(56) References Cited

U.S. PATENT DOCUMENTS

| 6,860,115 B2 | 3/2005 | Norelius et al. |
| 7,975,931 B2 | 7/2011 | Glielmo et al. |

(Continued)

FOREIGN PATENT DOCUMENTS

| AU | 2009202660 A1 | 7/2009 |
| DE | 102016011926 A1 | 6/2017 |

(Continued)

OTHER PUBLICATIONS

International Search Report for International Application No. PCT/US2019/046736; Date of Completion: Nov. 25, 2019; dated Dec. 3, 2019; 4 Pages.

(Continued)

*Primary Examiner* — A. Hunter Wilder
(74) *Attorney, Agent, or Firm* — CANTOR COLBURN LLP

(57) ABSTRACT

Disclosed is an enclosure having: a first sensor and a first controller for controlling the first sensor, the first sensor being an ultra-wide band (UWB) radar sensor, wherein the first controller monitors for cargo in the enclosure by scanning the container periodically and/or in response to one or more trigger events, and identifying from scanned data one or more of cargo type and cargo quantity.

19 Claims, 3 Drawing Sheets

(56) References Cited

U.S. PATENT DOCUMENTS

| | | |
|---|---|---|
| 8,231,053 B2 | 7/2012 | Linton et al. |
| 8,286,437 B2 | 10/2012 | Sanders et al. |
| 8,461,989 B2 | 6/2013 | Romero et al. |
| 8,959,036 B2 | 2/2015 | Huat |
| 9,829,898 B2 | 11/2017 | Saenz et al. |
| 9,958,198 B2 | 5/2018 | Rusignuolo et al. |
| 2003/0233189 A1 | 12/2003 | Hsiao et al. |
| 2006/0264221 A1 | 11/2006 | Koike et al. |
| 2008/0116269 A1* | 5/2008 | Dearing ............... G06Q 10/08 235/385 |
| 2009/0228155 A1 | 9/2009 | Slifkin et al. |
| 2010/0141443 A1* | 6/2010 | Romero ............... G08B 29/20 340/552 |
| 2017/0234608 A1* | 8/2017 | Sato .................... F25D 17/06 454/75 |

FOREIGN PATENT DOCUMENTS

| | | |
|---|---|---|
| EP | 2026053 A1 | 2/2009 |
| KR | 1020120010761 A | 2/2012 |
| WO | 2010045557 A2 | 4/2010 |
| WO | 2017106058 A1 | 6/2017 |

OTHER PUBLICATIONS

Written Opinion of the International Searching Authority for International Application No. PCT/US2019/046736; International Filing Date: Aug. 16, 2019; dated Dec. 3, 2019; 8 Pages.

Xiago Technologies; "XT1120 Cargo Sensor"; 2018; Retrieved from the Internet URL:https://callpassnow.com/wp-content/uploads/2018/03/Xirgo-XT1120-Data-Sheet-v1.pdf; 1 page.

* cited by examiner

ENCLOSURE WITH UWB SENSOR

CROSS-REFERENCE TO RELATED APPLICATIONS

This application is a Non-Provisional Application of PCT/US2019/046736 filed Aug. 16, 2019, which claims the benefit of Indian Application No. 201811030636 filed Aug. 16, 2018, the disclosure of which is incorporated herein by reference in its entirety.

BACKGROUND

The disclosed embodiments related to enclosures and more specifically to an enclosure container with an ultra-wide band (UWB) radar sensor to identify existence and volume of enclosure contents, and to estimate the type of the content.

Information regarding a presence or absence of cargo inside a truck-trailer or a container may help in reducing energy consumption as well as efforts to track cargo, for example to provide security for cargo within the container. Ultrasonic and infrared (IR) sensors are among the most commonly used for cargo sensing. In use with a refrigerated system, however, higher levels of humidity and condensed water that may exist within the trucks may limit the capabilities of ultrasonic and IR sensors for cargo sensing.

BRIEF DESCRIPTION

Disclosed is an enclosure comprising: a first sensor and a first controller for controlling the first sensor that is within the first sensor or remotely located, the first sensor being an ultra-wide band (UWB) radar sensor, wherein the first controller monitors for cargo in the enclosure by scanning the enclosure periodically and/or in response to one or more trigger events, and identifying from scanned data one or more of cargo presence, cargo type and cargo quantity.

In addition to one or more of the above disclosed features or elements or as an alternate the first controller provides from scanned data meta-data indicative of a presence or absence of cargo within the enclosure.

In addition to one or more of the above disclosed features or elements or as an alternate the first controller provides from scanned data relative positioning of cargo within a scanning field of the UWB sensor.

In addition to one or more of the above disclosed features or elements or as an alternate the first controller provides from scanned data reflected energy from cargo within the enclosure, indicative of the type of cargo being transported.

In addition to one or more of the above disclosed features or elements or as an alternate the enclosure includes a loading door, and when the door opens or closes the UWB sensor scans the enclosure, but not limited to these events.

In addition to one or more of the above disclosed features or elements or as an alternate the enclosure includes a door sensor and a controller controlling the door sensor and communicating over a network with the UWB sensor, and the UWB sensor receives from the door sensor an electronic communication identifying when the door opens or closes and thereafter scans the enclosure.

In addition to one or more of the above disclosed features or elements or as an alternate the UWB sensor detects when the door opens or closes thereafter scans the enclosure for cargo.

In addition to one or more of the above disclosed features or elements or as an alternate the enclosure includes a refrigeration system/air conditioner and a refrigeration system/air conditioner controller controlling the refrigeration system/air conditioner and communicating over a network with the UWB scanner, wherein upon the first controller determining from the scanned data the one or more of the cargo type and the cargo quantity, the first controller determines refrigeration/air conditioning requirements within the enclosure for the cargo, and instructs the air conditioner to condition air in the enclosure.

In addition to one or more of the above disclosed features or elements or as an alternate upon receiving electronic communication identifying opening or closing of the door, the first controller provides an alert that the door has opened or closed.

In addition to one or more of the above disclosed features or elements or as an alternate the first controller controls a visual display that visually displays the alert thereon, and/or the first controller transmits the alert to a remote monitoring facility.

Further disclosed is a method for monitoring cargo in a cargo enclosure that contains one or more of the above disclosed features and elements.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
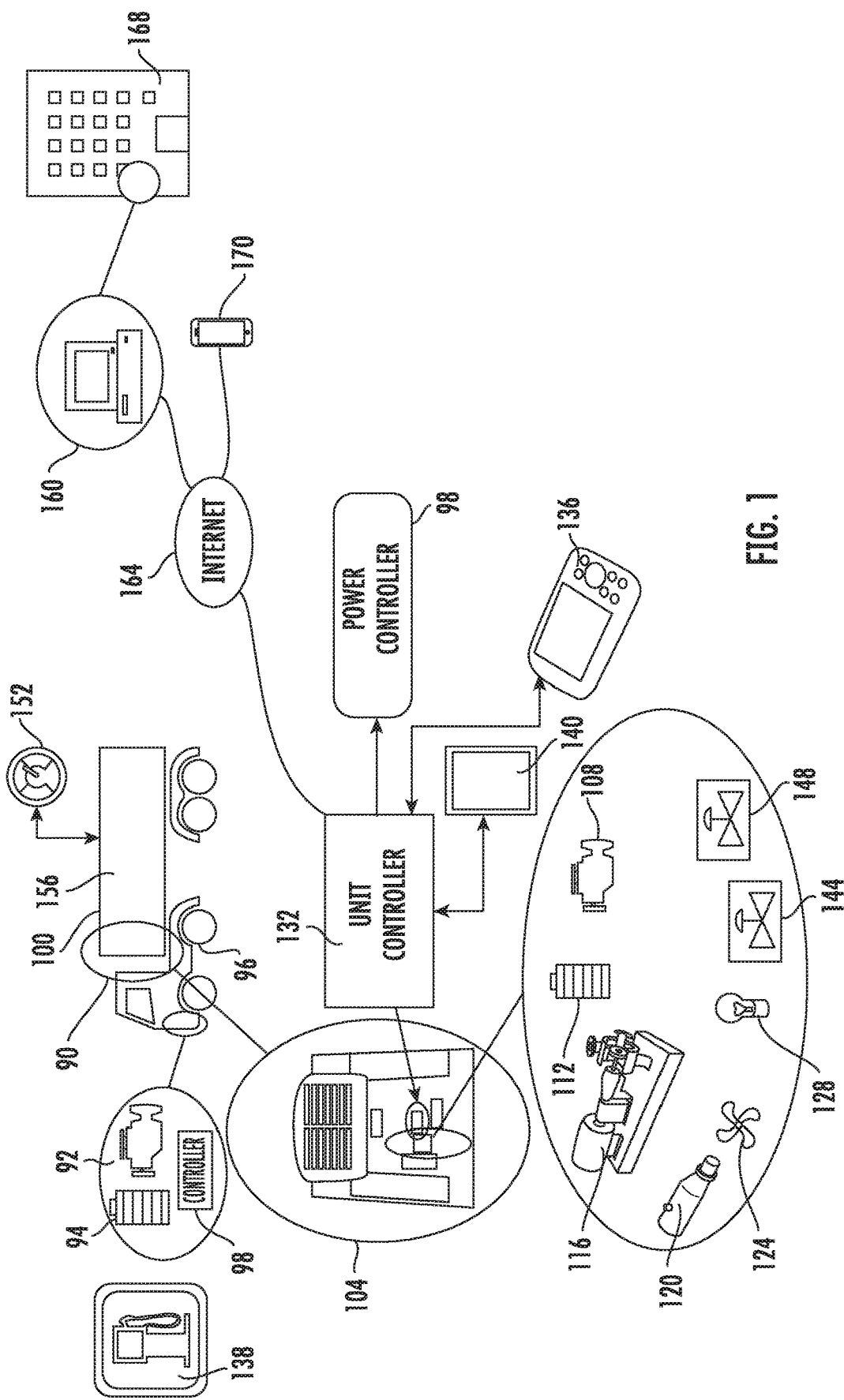
FIG. 1 illustrates technical features associated with one or more transportation refrigeration units according to a disclosed embodiment.

Turning to FIG. 1, the operational environment of an embodiment may include a trailer 100 having therein a transport refrigeration unit (TRU) 104. The trailer, which may be truck trailer, a container, or another box for transporting cargo, may be hauled by a tractor 90 having a plurality of power supply components. The plurality of power supply components may include one or more of a motor 92, a battery 94 and a power regenerative axle 96 solar panels mounted to the top of the trailer The plurality of TRU components may be dynamically controlled by a TRU electronics controller 132. The TRU controller may be onboard the TRU engine or may be a separate component in the TRU. The TRU controller may be capable of communicating with the trailer TRU power controller for controlling the use and distribution of power from the trailer power supply components.

The TRU controller may be equipped with a service providing dynamically updated Global Positioning Systems (GPS) data 136. Through the GPS the TRU controller may be able to identify best routes, a distance to a service station 138, and the like. It is to be appreciated that for an electrically powered TRU, the service station 138 would be connected to the electric grid. The TRU controller may include a visual interface 140. It is to be appreciate that the TRU controller is also a power sink. The TRU controller may control a plurality of cooling valves including an expansion valve 144 and a suction modulation valve 148.

In addition, the TRU controller may communicate with one or multiple cargo sensors 152 disposed in a cargo storage area 156. The TRU controller may communicate with the cargo sensor and may be programmed by a central server 160 which may be a fleet central server that manages a fleet of such trailers. Such communications may occur via cellular or other wireless network 164 or a wired network determined at a fleet headquarters 168. Communications may also be with one or more cellular devices 170 in possession of the vehicle operator or maintenance personnel for diagnostic or other operational purposes.

Figure 2:
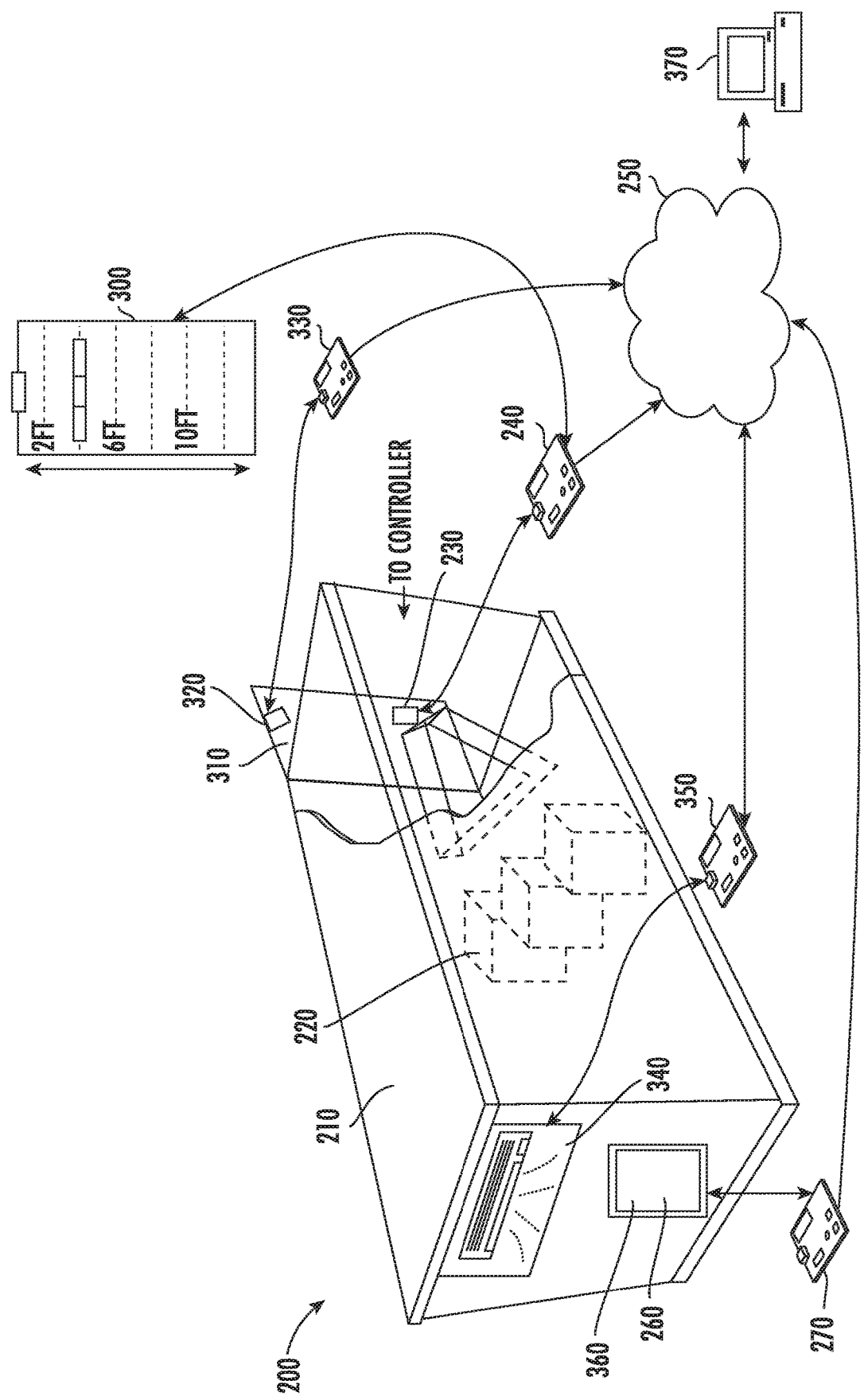
FIG. 2 illustrates technical features for monitoring cargo in a cargo container according to a disclosed embodiment.

Turning to FIG. 2, an embodiment of the disclosure provides a transportation refrigeration unit (TRU) 200. However, the scope of the disclosure is not limited to a TRU or any refrigerated system. Features and elements disclosed in FIG. 2 having nomenclature that is the same or similar to that in FIG. 1 may be similarly construed even though numerical identifiers may differ.

The TRU 200 may comprise a box cargo container 210 for storing cargo 220. The scope of the innovation is not limited to a cargo container but also applies to other types of enclosures. A first sensor 230 may be operationally disposed in the container 210 along with a first controller 240 for communicating with the first sensor 230 and processing sensed data and communicating with the TRU direction or over a network 250. The first sensor 230 is ultra-wide band (UWB) radar sensor, which may have multiple transmitters and receivers. UWB sensors may transmit signals across a wide frequency. The transmitted signal may be significant for having a relatively light power spectrum. UWB sensors may emit and detect low impulses returning radar signals.

The TRU 200 may include a TRU hub 260, which may be an electronic hub. In addition, the TRU 200 may include a TRU controller 270 for controlling the TRU hub 260 and communicating over the network 250. The TRU hub 260 and the TRU controller 270 may be used for all processing related to plurality of controllers identified in this disclosure. Alternatively, all controller functions provided in this disclosure may be performed directly by the TRU hub 260.

Figure 3:
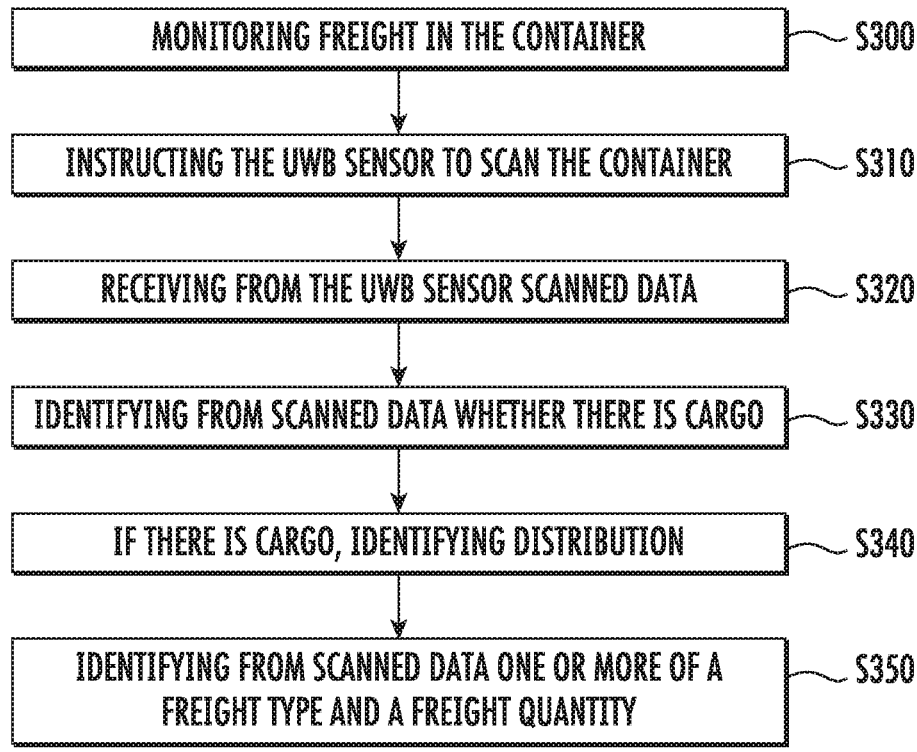
FIG. 3 illustrates steps for monitoring cargo in a cargo container according to a disclosed embodiment.

Turning to FIG. 3, the TRU hub 260 may perform step S300 of monitoring cargo 220 in the container 210. Step S300 may include S310 of instructing the UWB sensor 230 to scan the container 210. Step S300 may further include step S320 of receiving from the UWB sensor 230 scanned data. In addition, step S300 may include step S330 of identifying from scanned data whether cargo is present. If there is cargo, at step S340 the TRU hub 260 may determine a distribution of cargo within the container 210 and at step S350 the TRU hub 360 may identify one or more of a fright type and cargo quantity.

Returning to FIG. 2, in one embodiment the TRU hub 260 may provide, from the sensed data meta, data 300 indicative of a presence or absence of cargo 220 within the container 210, a distance to the cargo from the sensor, and a type of cargo. In addition, the TRU hub 260 may provide, from the sensed data, cooling requirements, which may be controlled based on cargo position and cargo type. This data may be used to determine the cooling requirements of the cargo 220, as disclosed in greater detail below.

In one embodiment the TRU hub 260 may periodically instruct the UWB sensor 230 to perform such scans. For example, the TRU hub 260 may be programmed to obtain scans several times during a period of transportation of cargo 220.

In one embodiment the container 210 may include a loading door 310. When the door 310 opens or closes the TRU hub 260 may send to the UWB sensor 230 instructions to scan the container 210. This may enable the TRU hub 260 to scan at times when the cargo is most likely to change in distribution or quantity in the container 210, and to save energy required for sensing and communications. Such times are when air conditioning/refrigeration needs may be most likely to change within the container, or when the security checks on the cargo needs to be done. By scanning primarily at such times and adjusting air conditioning/refrigeration requirements from such scans, overall conditioning efficiencies may be increased.

Figure 4:
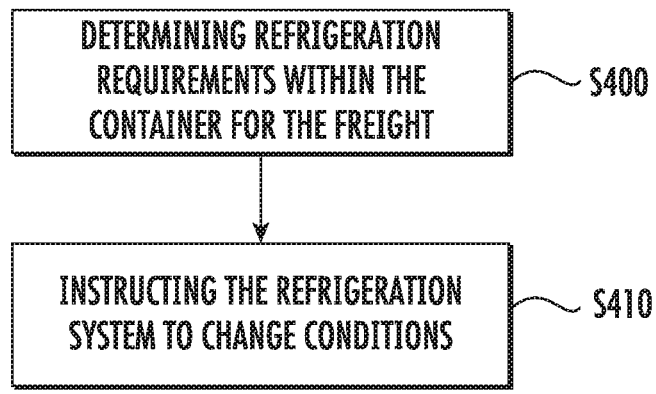
FIG. 4 illustrates steps for monitoring cargo in a cargo container according to a disclosed embodiment.

In one embodiment the container 210 may include a door sensor 320 and a third controller 330 controlling the door sensor 320 and communicating over the network 250. The door sensors may be any type of sensors, or UWB can also be used to detect door opening and closing. The TRU hub 260 may receive from the door sensor 320 an electronic communication identifying when the door 310 opens or closes. Upon receiving the electronic communication identifying the door 310 opening or closing, the TRU hub 260 may send to the UWB sensor 230 instructions to scan the container 210. This configuration is provided to save energy, as cargo does not change based on door motion. In addition, or as an alternate, scanning may occur at any time In one embodiment the TRU 200 may include an air conditioner/refrigeration unit 340 and an air conditioner/refrigeration unit controller 350 controlling the air conditioner/refrigeration unit 340 and communicating over the network 250. As further illustrated in FIG. 4, upon identifying the existing of the fright, and/or cargo type and/or cargo quantity, the TRU hub 260 may perform step S400 of determining air conditioner/refrigeration unit requirements within the container 210 for the cargo 220. Step S400 may include step S410 instructing the air conditioner/refrigeration unit 340 to condition the container 210, that is, to modify the then-existing conditions in the container, based on the determination.

Within the scope of the disclosed embodiments is utilizing the disclosed system for security purposes. For example, if the system is able to identify that cargo type/number changes, the system may be able to trace whether the cargo has been stolen or inappropriately handled.

In one embodiment upon receiving the electronic communication identifying the opening or closing of the door 310, the TRU hub 260 may provide an alert that the door 310 has opened or closed. For example, as illustrated in FIG. 2, the TRU hub 260 may include a visual display 360 and the alert may be a visual alert on the display 360. In one embodiment the TRU hub 260 may electronically transmit the alert to a remote monitoring facility 370. Such configuration may enable monitoring of stored cargo 220.

The above provides a solution using a multi-band antenna (multi) ultra-wide band (UWB) radar (UWB radar) to detect a presence, a distribution and a location of cargo. UWB radar may be used to estimate type of cargo (e.g. fruits, fish and/or meat) based on estimation of water content levels. This information may be valuable for maintain a level of refrigeration temperatures appropriate for the cargo.

The above disclosed embodiments may include, but are not limited to, developing a 3D image of an area and providing an illustration and/or identification of a presence of cargo, an absence of cargo, a physical distribution range of cargo and/or an angle of distribution cargo relative to a radar; it could also be used to determine door open/close conditions or any other change of geometry of the container, trailer, or any enclosure. The radar may be mounted, e.g., to part of the reefer unit. The mounting of the radar in FIG. 2 is schematic only and not intended to illustrate an exact mounting location for the radar.

Benefits of the disclosed embodiments include the use of a single UWB sensors for the entire container (or any similar type of enclosure) to indicate existence of cargo, estimate cargo type/quantify for energy efficiency and/or security uses. In addition, the system of the disclosed embodiments may be relatively immune to environmental impacting conditions such as high humidity and condensation, low temperature and frosting, and low light conditions.

It is to be appreciated that the above system applies to containers and, in addition thereto or as an alternate, to cargo boxes, truck trailers and the like which contain goods. In addition, other uses of the disclosed implements than refrigeration and conditioning of air within the container are within the scope of the disclosure.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration unit (TRU), comprising:
   an enclosure;
   a first sensor in the enclosure controlled by a first controller that is within the first sensor or remotely located, the first sensor being an ultra-wide band (UWB) radar sensor,
   wherein the first controller monitors for cargo in the enclosure by:
      scanning the enclosure periodically and/or in response to one or more trigger events, and
      identifying, from scanned data, cargo presence, cargo type, cargo quantity and cargo distribution within the enclosure;
   a refrigeration system/air conditioner and a refrigeration system/air conditioner controller controlling the refrigeration system/air conditioner and communicating over a network with the UWB radar sensor,
   wherein upon the first controller identifying the cargo presence, the cargo type, the cargo quantity and the cargo distribution within the enclosure, the first controller:
      determines refrigeration/air conditioning requirements within the enclosure for the cargo based on the identified cargo presence, cargo type, cargo quantity and cargo distribution, and
      instructs the refrigeration system/air conditioner to condition air in the enclosure based on the identified cargo presence, cargo type, cargo quantity and cargo distribution.

2. The TRU of claim 1, wherein the controller provides from scanned data, meta data indicative of a presence or absence of cargo within the enclosure.

3. The TRU of claim 1, wherein when cargo is detected the TRU provides from scanned data relative positioning of cargo within a scanning field of the UWB sensor.

4. The TRU of claim 1, wherein the first controller provides from scanned data reflected energy from cargo within the enclosure.

5. The TRU of claim 1, wherein the enclosure includes a loading door, and when the door opens or closes the UWB sensor scans the enclosure.

6. The TRU of claim 5, wherein the UWB sensor detects when the door opens or closes thereafter scans the enclosure for cargo.

7. The TRU of claim 1, wherein the first controller monitors for cargo in the enclosure by identifying, from scanned data, an angle of distribution of the cargo relative to the first sensor, and
   wherein upon the first controller identifying the cargo presence, the cargo type, the cargo quantity, the cargo distribution, and the angle of distribution of the cargo relative to the first sensor within the enclosure, the first controller:
      determines refrigeration/air conditioning requirements within the enclosure for the cargo, and
      instructs the refrigeration system/air conditioner to condition air in the enclosure.

8. The TRU of claim 1, wherein the first controller provides an alert upon one or more of (1) receiving electronic communication identifying opening or closing of the door, (ii) identifying changes in cargo within the enclosure.

9. The TRU of claim 8, wherein the first controller controls a visual display that visually displays the alert thereon, and/or the first controller transmits the alert to a remote monitoring facility.

10. A method for monitoring an enclosure of a transport refrigeration unit (TRU), the enclosure including: a first sensor and a first controller for controlling the first sensor that is within the first sensor or remotely located, the first sensor being an ultra-wide band (UWB) radar sensor and wherein the TRU includes a refrigeration system/air conditioner and a refrigeration system/air conditioner controller controlling the refrigeration system/air conditioner and communicating over a network with the UWB radar sensor, the method comprising:
   monitoring, by the first controller, for cargo in the enclosure by:
      scanning the enclosure periodically and/or in response to one or more trigger events, and
      identifying from scanned data cargo presence, cargo type, cargo quantity and cargo distribution within the enclosure, and wherein upon the first controller identifying the cargo presence, the cargo type, the cargo quantity and the cargo distribution within the enclosure, determining, by the first controller, refrigeration/air conditioning requirements within the enclosure for the cargo based on the identified cargo presence, cargo type, cargo quantity and cargo distribution, and instructing, by the first controller, the refrigeration system/air conditioner to condition air in the enclosure based on the identified cargo presence, cargo type, cargo quantity and cargo distribution.

11. The method of claim 10, wherein the first controller provides from scanned data meta data indicative of a presence or absence of cargo within the enclosure.

12. The method of claim 10, wherein when cargo is detected the first controller provides from scanned data relative positioning of cargo within a scanning field of the UWB sensor.

13. The method of claim 10, wherein the first controller provides from scanned data reflected energy from cargo within the enclosure.

14. The method of claim 10, wherein the enclosure includes a loading door, and when the door opens or closes the UWB sensor scans the enclosure.

15. The method of claim 14, wherein the enclosure includes a door sensor and a controller controlling the door sensor and communicating over a network with the UWB sensor, and the UWB sensor receives from the door sensor an electronic communication identifying when the door opens or closes and thereafter scans the enclosure.

16. The method of claim 14, wherein the UWB sensor detects when the door opens or closes thereafter scans the enclosure for cargo.

17. The method of claim 10, wherein the first controller monitors for cargo in the enclosure by identifying from scanned data, an angle of distribution of the cargo relative to the first sensor, and wherein upon the first controller identifying the cargo presence, the cargo type, the cargo quantity, the cargo distribution, and the angle of distribution of the cargo relative to the first sensor within the enclosure, the first controller:

determines refrigeration/air conditioning requirements within the enclosure for the cargo, and instructs the refrigeration system/air conditioner to condition air in the enclosure.

18. The method of claim 10, wherein the first controller provides an alert upon one or more of (i) receiving electronic communication identifying opening or closing of the door, (ii) identifying changes in cargo within the enclosure.

19. The method of claim 18, wherein the first controller controls a visual display that visually displays the alert thereon, and/or the first controller transmits the alert to a remote monitoring facility.

* * * * *